United States Patent
Miyamoto

(10) Patent No.: US 11,479,232 B2
(45) Date of Patent: Oct. 25, 2022

(54) HYBRID VEHICLE

(71) Applicant: TOYOTA JIDOSHA KABUSHIKI KAISHA, Toyota (JP)

(72) Inventor: Tomohiko Miyamoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 16/790,954

(22) Filed: Feb. 14, 2020

(65) Prior Publication Data

US 2020/0298822 A1    Sep. 24, 2020

(30) Foreign Application Priority Data

Mar. 22, 2019  (JP) .............................. JP2019-055294

(51) Int. Cl.
| | |
|---|---|
| *B60W 20/10* | (2016.01) |
| *B60K 6/24* | (2007.10) |
| *B60K 6/26* | (2007.10) |
| *B60K 6/38* | (2007.10) |
| *B60K 6/28* | (2007.10) |
| *B60W 10/02* | (2006.01) |
| *B60W 10/06* | (2006.01) |
| *B60W 10/08* | (2006.01) |

(52) U.S. Cl.
CPC .............. *B60W 20/10* (2013.01); *B60K 6/24* (2013.01); *B60K 6/26* (2013.01); *B60K 6/28* (2013.01); *B60K 6/38* (2013.01); *B60W 10/02* (2013.01); *B60W 10/06* (2013.01); *B60W 10/08* (2013.01)

(58) Field of Classification Search
CPC ...... B60W 20/10; B60W 10/02; B60W 10/06; B60W 10/08; B60W 2510/244; B60W 2520/10; B60W 20/20; B60W 10/26; B60W 20/40; B60W 30/182; B60K 6/24; B60K 6/26; B60K 6/28; B60K 6/38; B60K 2023/0825; B60K 17/354; B60K 17/356; B60K 23/0808; B60K 2001/001; B60K 1/00; B60K 6/387; B60K 6/52; B60K 6/442; B60K 6/50; Y02T 10/62; Y02T 10/70; B60Y 2200/92

See application file for complete search history.

(56) References Cited

U.S. PATENT DOCUMENTS

| | | | |
|---|---|---|---|
| 5,586,613 A | 12/1996 | Ehsani | |
| 7,836,986 B1 * | 11/2010 | Gillecriosd | B60K 6/442 180/170 |

FOREIGN PATENT DOCUMENTS

| | | |
|---|---|---|
| CN | 102555762 B | 1/2015 |
| FR | 3065920 A1 | 11/2018 |
| JP | 8-237806 A | 9/1996 |

(Continued)

*Primary Examiner* — Brian P Sweeney
(74) *Attorney, Agent, or Firm* — Sughrue Mion, PLLC

(57) ABSTRACT

A hybrid vehicle includes an engine, a first motor generator, a first clutch, a second clutch, a second motor generator, a power storage device, and an electronic control unit configured to control the engine, the first motor generator, the second motor generator, the first clutch, and the second clutch. The electronic control unit is configured to engage the first clutch and disengage the second clutch such that the first motor generator generates power using power from the engine and the hybrid vehicle runs using power from the second motor generator, when a vehicle speed is equal to or lower than a predetermined vehicle speed.

2 Claims, 3 Drawing Sheets

(56) References Cited

FOREIGN PATENT DOCUMENTS

| JP | 10-217779 A | 8/1998 |
| JP | 2014-091520 A | 5/2014 |
| JP | 2015-074299 A | 4/2015 |

* cited by examiner

HYBRID VEHICLE

INCORPORATION BY REFERENCE

The disclosure of Japanese Patent Application No. 2019-055294 filed on Mar. 22, 2019 including the specification, drawings and abstract is incorporated herein by reference in its entirety.

BACKGROUND

1. Technical Field

The present disclosure relates to a hybrid vehicle.

2. Description of Related Art

Hitherto, there has been proposed a hybrid vehicle that includes an engine, an electric motor, a clutch that connects and disconnects an output shaft of the engine and a rotary shaft of the electric motor, and an automatic transmission connected to the rotary shaft of the electric motor and a drive shaft coupled to a drive wheel (see, for example, Japanese Unexamined Patent Application Publication No. 2014-91520 (JP 2014-91520 A)). The clutch of the vehicle is disengaged to switch a running mode of the vehicle from engine running to electric running. When an estimated temperature of the clutch is equal to or higher than a determination value, the disengagement of the clutch is restricted and the engine running is continued. Thereby, a decrease in durability of the clutch is suppressed.

SUMMARY

In the hybrid vehicle described above, an automatic transmission having a torque converter is used. However, a configuration can be conceived in which the rotary shaft of the electric motor and an input shaft of the transmission are engaged and disengaged by a friction engagement clutch, rather than using the torque converter. In this case, the friction engagement clutch needs to be slipped to transmit an output from the engine to the transmission in a low speed range. This increases a temperature of the friction engagement clutch and decreases the durability of the friction engagement clutch.

The hybrid vehicle in the present disclosure can improve the durability of the friction engagement clutch.

A hybrid vehicle according to an aspect of the present disclosure includes an engine; a first motor generator; a first clutch configured to allow and interrupt power transmission between an output shaft of the engine and a rotary shaft of the first motor generator; a second clutch that is a friction engagement clutch and that is configured to allow and interrupt power transmission between the rotary shaft of the first motor generator and a first drive shaft coupled to one of a front wheel and a rear wheel; a second motor generator configured to input power from and output power to a second drive shaft coupled to the other of the front wheel and the rear wheel, which differs from the one of the front wheel and the rear wheel; a power storage device connected to the first motor generator such that power transmission between the first motor generator and the power storage device is allowed, and the second motor generator such that power transmission between the second motor generator and the power storage device is allowed; and an electronic control unit configured to control the engine, the first motor generator, the second motor generator, the first clutch, and the second clutch. The electronic control unit is configured to engage the first clutch and disengage the second clutch such that the first motor generator generates power using power from the engine and the hybrid vehicle runs using power from the second motor generator, when a vehicle speed is equal to or lower than a predetermined vehicle speed.

In the hybrid vehicle according to the aspect of the present disclosure, the output shaft of the engine and the rotary shaft of the first motor generator are connected to each other by the first clutch. The rotary shaft of the first motor generator and the first drive shaft coupled to the one of the front wheel or the rear wheel are connected to each other by the second clutch, which is a friction engagement clutch. Engaging both the first clutch and the second clutch enables the hybrid vehicle to run using the power from the engine and the power from the first motor generator. The second motor generator is connected to the second drive shaft coupled to the other of the front wheel and the rear wheel, which differs from the one of the front wheel and the rear wheel (the other of the front wheel and the rear wheel is the rear wheel when the one of the front wheel and the rear wheel is the front wheel, whereas the other of the front wheel and the rear wheel is the front wheel when the one of the front wheel and the rear wheel is the rear wheel). When the vehicle speed is equal to or lower than the predetermined vehicle speed, the electronic control unit performs control so as to engage the first clutch, disengage the second clutch such that the first motor generator generates power using the power from the engine and the hybrid vehicle runs using the power from the second motor generator. With the above configuration, it is not necessary to slip the second clutch when the vehicle speed is equal to or lower than the predetermined vehicle speed. Thus, it is possible to suppress the second clutch from overheating due to slipping of the second clutch. As a result, the durability of the friction engagement second clutch can be improved. Here, the "predetermined vehicle speed" can be set to a maximum vehicle speed within a vehicle speed region in which the second clutch needs to be slipped to transmit power from the engine to the first drive shaft, or a vehicle speed that is slightly higher than the maximum vehicle speed.

In the above aspect, the electronic control unit may be configured to stop the engine, disengage the first clutch, and engage the second clutch such that the hybrid vehicle runs using at least one of power from the first motor generator and the power from the second motor generator, when the vehicle speed is equal to or lower than the predetermined vehicle speed but a power storage rate of the power storage device is equal to or higher than a predetermined rate.

With the above configuration, when the vehicle speed is equal to or lower than the predetermined vehicle speed, the hybrid vehicle can run using the power from the first motor generator in addition to the power from the second motor generator. Thus, the hybrid vehicle can run with a higher drive force.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a mode for carrying out the present disclosure will be described with reference to an embodiment.

Figure 1:
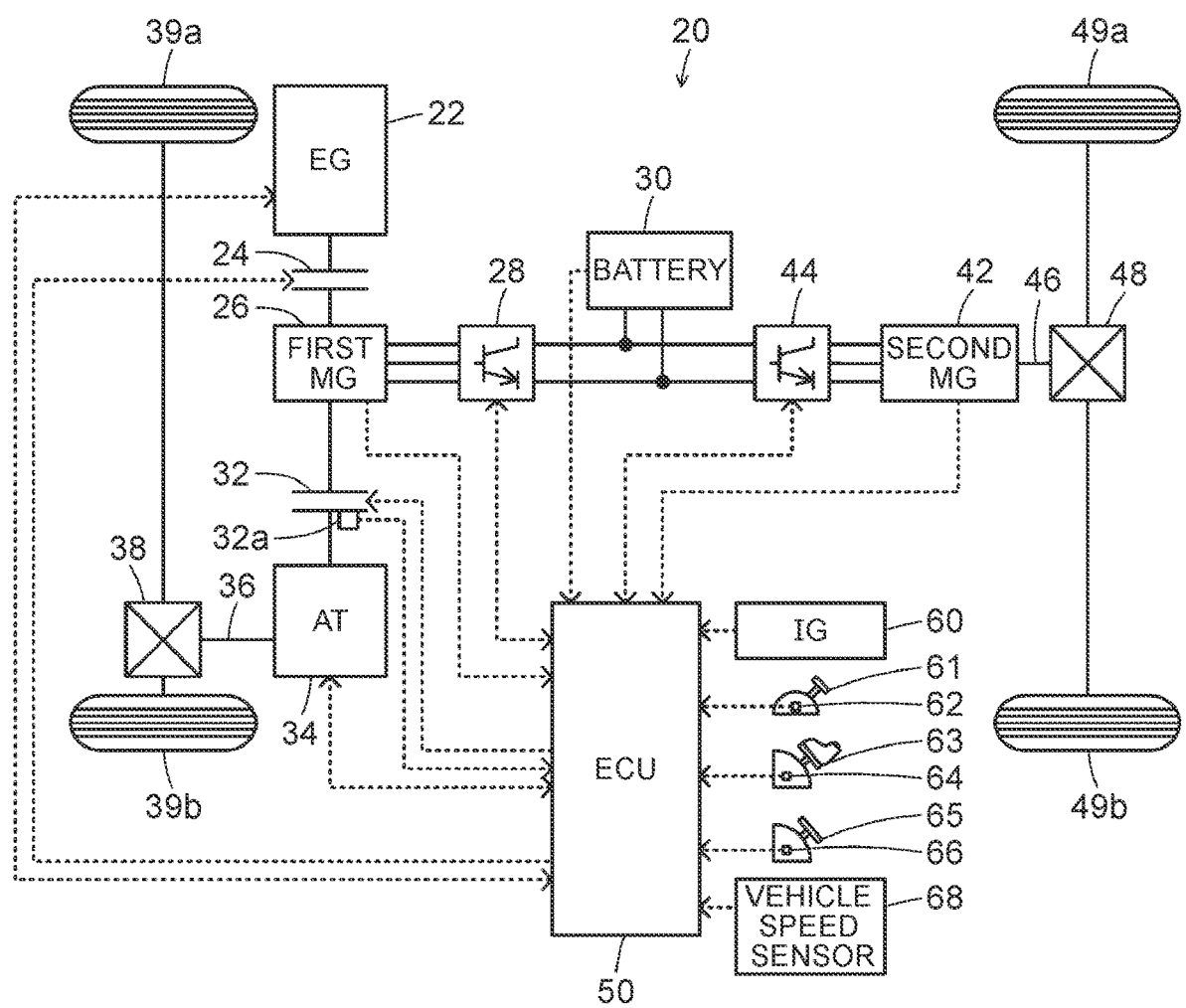
FIG. 1 is a diagram showing a schematic configuration of a hybrid vehicle 20 according to an embodiment of the present disclosure.

FIG. 1 is a diagram showing a schematic configuration of a hybrid vehicle 20 according to an embodiment of the present disclosure. As shown in FIG. 1, the hybrid vehicle 20 according to the embodiment includes an engine 22, a first clutch 24, a first motor generator 26, a first inverter 28, a battery 30 serving as a power storage device, a second clutch 32, a transmission 34, a second motor generator 42, a second inverter 44, and an electronic control unit 50.

The engine 22 is an internal combustion engine that outputs power using fuel such as gasoline and light oil. The first clutch 24 is, for example, a hydraulic-driven friction engagement clutch, and allows and interrupts power transmission between a crankshaft of the engine 22 and a rotary shaft of the first motor generator 26.

The first motor generator 26 is a synchronous electric motor generator and has a rotor and a stator. A permanent magnet is embedded in a rotor core of the rotor. A three-phase coil is wound around a stator core of the stator. The first inverter 28 is used for driving the first motor generator 26 and connected to the battery 30 through power lines. The electronic control unit 50 performs switching control for a plurality of switching elements (not shown) in the first inverter 28, thereby driving rotation of the first motor generator 26. The battery 30 is, for example, a lithium-ion secondary battery or a nickel metal hydride battery.

The second clutch 32 is, for example, a hydraulic-driven friction engagement clutch, and allows and interrupts power transmission between the rotary shaft of the first motor generator 26 and an input shaft of the transmission 34. The transmission 34 is, for example, a four-speed, a six-speed, an eight-speed, or a 10-speed automatic transmission, and has the input shaft, an output shaft, a plurality of planetary gears, and a plurality of hydraulic-driven friction engagement elements (clutches and brakes). The output shaft of the transmission 34 is connected to a first drive shaft 36 coupled to front wheels 39a, 39b through a differential gear 38.

The second motor generator 42 is a synchronous electric motor generator, and has a rotor and a stator. A permanent magnet is embedded in a rotor core of the rotor. A three-phase coil is wound around a stator core of the stator. The rotor of the second motor generator 42 is connected to a second drive shaft 46 coupled to rear wheels 49a, 49b through a differential gear 48. The second inverter 44 is used for driving the second motor generator 42 and connected to the battery 30 through the power lines. The electronic control unit 50 performs switching control for a plurality of switching elements (not shown) in the second inverter 44, thereby driving rotation of the second motor generator 42.

The electronic control unit 50 is constituted as a microprocessor mainly including a CPU. In addition to the CPU, the electronic control unit 50 includes a read only memory (ROM) for storing a processing program, a random access memory (RAM) for storing data temporarily, an input port, and an output port. Signals transmitted from various sensors are input to the electronic control unit 50 via the input port. Examples of the signals input to the electronic control unit 50 include a crankshaft angle θcr of the engine 22 and a coolant temperature Tw of the engine 22. The crankshaft angle θcr of the engine 22 is transmitted from a crank angle sensor that detects a crank angle of the crankshaft of the engine 22. The coolant temperature Tw of the engine 22 is transmitted from a coolant temperature sensor that detects a temperature of a coolant of the engine 22. The examples of the signals input to the electronic control unit 50 also include a rotation position θm1 of the first motor generator 26, V-phase and W-phase currents Iv1, Iw1 of the first motor generator 26, a rotation position θm2 of the second motor generator 42, and V-phase and W-phase currents Iv2, Iw2 of the second motor generator 42. The rotation position θm1 of the first motor generator 26 is transmitted from a rotation position sensor that detects a rotation position of the rotor of the first motor generator 26. The V-phase and W-phase currents Iv1, Iw1 of the first motor generator 26 are transmitted from a current sensor that detects a current flowing in each phase of the first motor generator 26. The rotation position θm2 of the second motor generator 42 is transmitted from a rotation position sensor that detects a rotation position of the rotor of the second motor generator 42. The V-phase and W-phase currents Iv2, Iw2 of the second motor generator 42 are transmitted from a current sensor that detects a current flowing in each phase of the second motor generator 42. Further, the examples of the signals input to the electronic control unit 50 also include a voltage Vb of the battery 30, a current Ib of the battery 30, and a temperature Tb of the battery 30. The voltage Vb of the battery 30 is transmitted from a voltage sensor attached between terminals of the battery 30. The current Ib of the battery 30 is transmitted from a current sensor attached to an output terminal of the battery 30. The temperature Tb of the battery 30 is transmitted from a temperature sensor attached to the battery 30. Still further, the examples of the signals input to the electronic control unit 50 also include a temperature Tclt of the second clutch 32, a rotation speed Nin of the input shaft of the transmission 34, and a rotation speed Nout of the output shaft of the transmission 34. The temperature Tclt of the second clutch 32 is transmitted from a temperature sensor 32a attached to the second clutch 32. The rotation speed Nin of the input shaft of the transmission 34 is transmitted from a rotation speed sensor that detects the rotation speed of the input shaft of the transmission 34. The rotation speed Nout of the output shaft of the transmission 34 is transmitted from a rotation speed sensor that detects the rotation speed of the output shaft of the transmission 34. Still further, the examples of the signals input to the electronic control unit 50 also include an ignition signal, a shift position SP, an accelerator operation amount Acc, a brake pedal position BP, and a vehicle speed V. The ignition signal is transmitted from an ignition switch 60. The shift position SP is transmitted from a shift position sensor 62 that detects an operation position of a shift lever 61. The accelerator operation amount Acc is transmitted from an accelerator pedal position sensor 64 that detects a depression amount of an accelerator pedal 63. The brake pedal position BP is transmitted from a brake pedal position sensor 66 that detects a depression amount of a brake pedal 65. The vehicle speed V is transmitted from a vehicle speed sensor 68.

Various control signals are output from the electronic control unit 50 through the output port. Examples of the signals output from the electronic control unit 50 include control signals transmitted to the engine 22, the first clutch 24, the first inverter 28, the second clutch 32, the transmission 34, and the second inverter 44. The electronic control unit 50 computes an engine speed Ne of the engine 22 based on the crank angle θcr of the crankshaft of the engine 22, which is transmitted from the crank angle sensor. The electronic control unit 50 also computes an electrical angle θe1 and a rotation speed Nm1 of the first motor generator 26 based on the rotation position θm1 of the rotor of the first motor generator 26, which is transmitted from the rotation position sensor. The electronic control unit 50 also computes a power storage rate SOC of the battery 30 based on the current Ib of the battery 30, which is transmitted from the current sensor. The electronic control unit 50 also computes an electrical angle θe2 and a rotation speed Nm2 of the second motor generator 42 based on the rotation position θm2 of the rotor of the second motor generator 42, which is transmitted from the rotation position sensor.

In the hybrid vehicle 20 configured as described above, the electronic control unit 50 controls the engine 22, the first clutch 24, the first motor generator 26 (first inverter 28), the second clutch 32, the transmission 34, and the second motor generator 42 (second inverter 44) such that the hybrid vehicle 20 runs in a hybrid running mode (HV running mode) or an electric running mode (EV running mode). In the HV running mode, the hybrid vehicle 20 runs with rotation of the engine 22. In the EV running mode, the hybrid vehicle 20 runs with the rotation of the engine 22 stopped.

Figure 2:
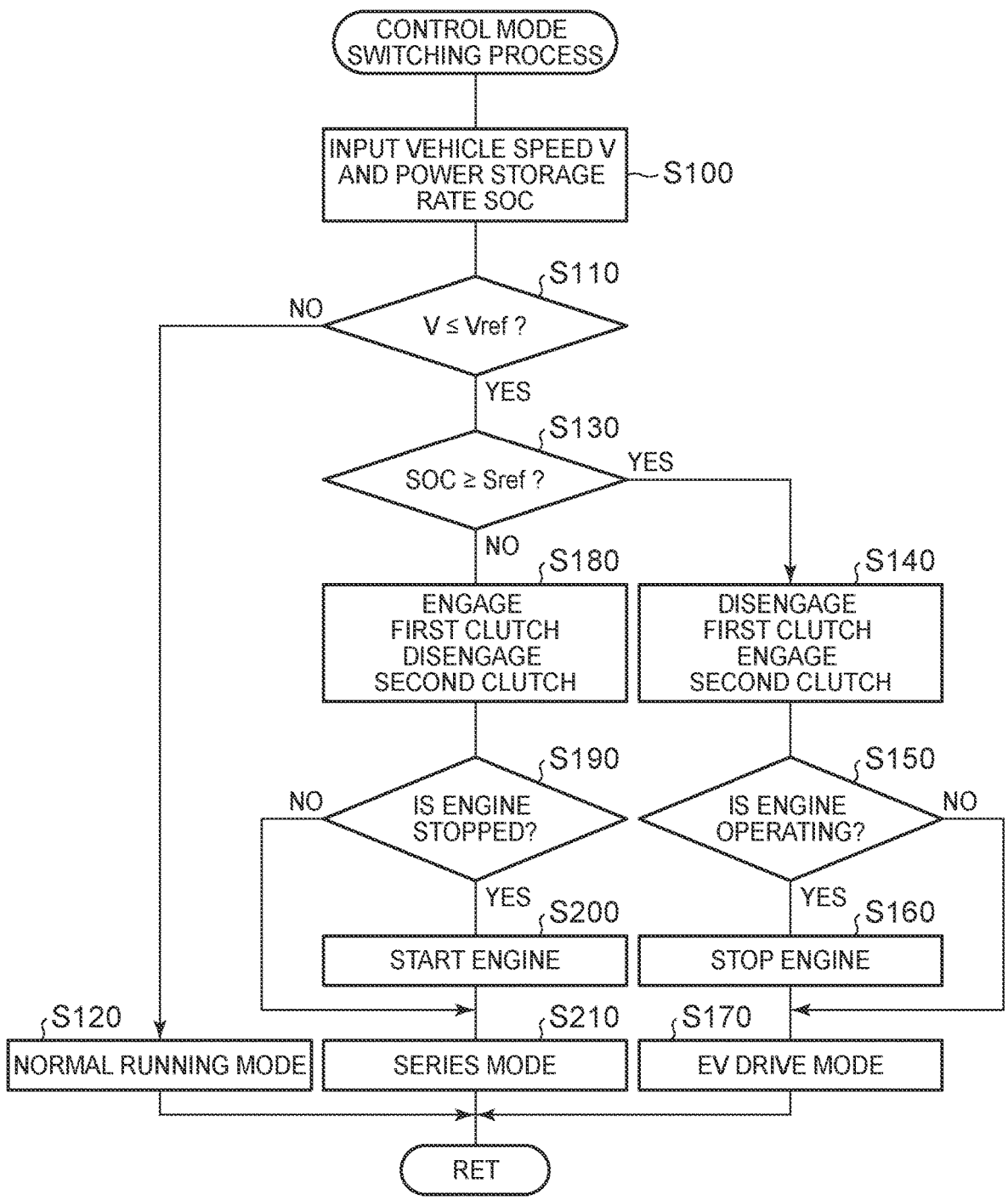
FIG. 2 is a flowchart showing an example of a control mode switching process executed by an electronic control unit 50.

Next, operation of the hybrid vehicle 20 according to the embodiment configured as described above, particularly when the hybrid vehicle 20 runs at a predetermined vehicle speed or lower, will be described. FIG. 2 is a flowchart showing an example of a control mode switching process executed by the electronic control unit 50. The process is repeatedly executed.

When the control mode switching process is executed, first, the electronic control unit 50 executes processing for inputting the vehicle speed V transmitted from the vehicle speed sensor 68 and the power storage rate (state of charge) SOC of the battery 30 (step S100). The power storage rate SOC of the battery 30 can be computed based on the current Ib transmitted from the current sensor (not shown).

Next, the electronic control unit 50 determines whether the input vehicle speed V is equal to or lower than a threshold Vref (step S110). The threshold Vref can be set in advance to a maximum vehicle speed within a vehicle speed region in which the second clutch 32 needs to be slipped to transmit power from the engine 22 to the first drive shaft 36, or a vehicle speed that is slightly higher than the maximum vehicle speed. When the vehicle speed V is higher than the threshold Vref, the electronic control unit 50 determines that there is no need to slip the second clutch 32 to transmit the power from the engine 22 to the first drive shaft 36. Thus, the electronic control unit 50 sets the running mode to a normal running mode (step S120). In the normal running mode, the running mode is switched, according to the situation, between the HV running mode in which the hybrid vehicle 20 runs with the rotation of the engine 22, and the EV running mode in which the hybrid vehicle 20 runs with the rotation of the engine 22 stopped. Then, the process ends.

When the electronic control unit 50 determines in step S110 that the vehicle speed V is equal to or lower than the threshold Vref, the electronic control unit 50 determines whether the power storage rate SOC of the battery 30 is equal to or higher than a threshold Sref (step S130). The threshold Sref can be set in advance to a power storage rate SOC with which the hybrid vehicle 20 can run in the EV running mode to some extent. When the electronic control unit 50 determines that the power storage rate SOC is equal to or higher than the threshold Sref, the first clutch 24 is disengaged and the second clutch 32 is engaged (step S140). Subsequently, when the engine 22 is operating, the engine 22 is stopped (steps S150, S160), and the running mode is set to an EV drive mode in which the hybrid vehicle 20 runs using power from the first motor generator 26 and power from the second motor generator 42 (step S170). Then, the process ends. This enables the hybrid vehicle 20 to run using power from the first motor generator 26 and the power from the second motor generator 42. The hybrid vehicle 20 may run using one of the power from the first motor generator 26 and the power from the second motor generator 42.

In contrast, when the electronic control unit 50 determines in step S130 that the power storage rate SOC is lower than the threshold Sref, the first clutch 24 is engaged and the second clutch 32 is disengaged (step S180). Subsequently, when the engine 22 is stopped, the engine 22 is started (steps S190, S200), and the running mode is set to a series mode in which the first motor generator 26 generates power using the power from the engine 22 and the hybrid vehicle 20 runs using the power from the second motor generator 42 (step S210). Then, the process ends. Accordingly, it is not necessary to slip the second clutch 32 when the vehicle speed V is equal to or lower than the threshold Vref. Thus, it is possible to suppress the second clutch 32 from overheating due to slipping of the second clutch 32. In the series mode, an operation point of the engine 22 and an amount of power to be generated by the first motor generator 26 may be set as appropriate. For example, the engine 22 may be operated so as to output power required for running to generate power, and the engine 22 may be operated at a predetermined operation point, of operation points at which the engine 22 can operate efficiently, to generate power.

Figure 3:
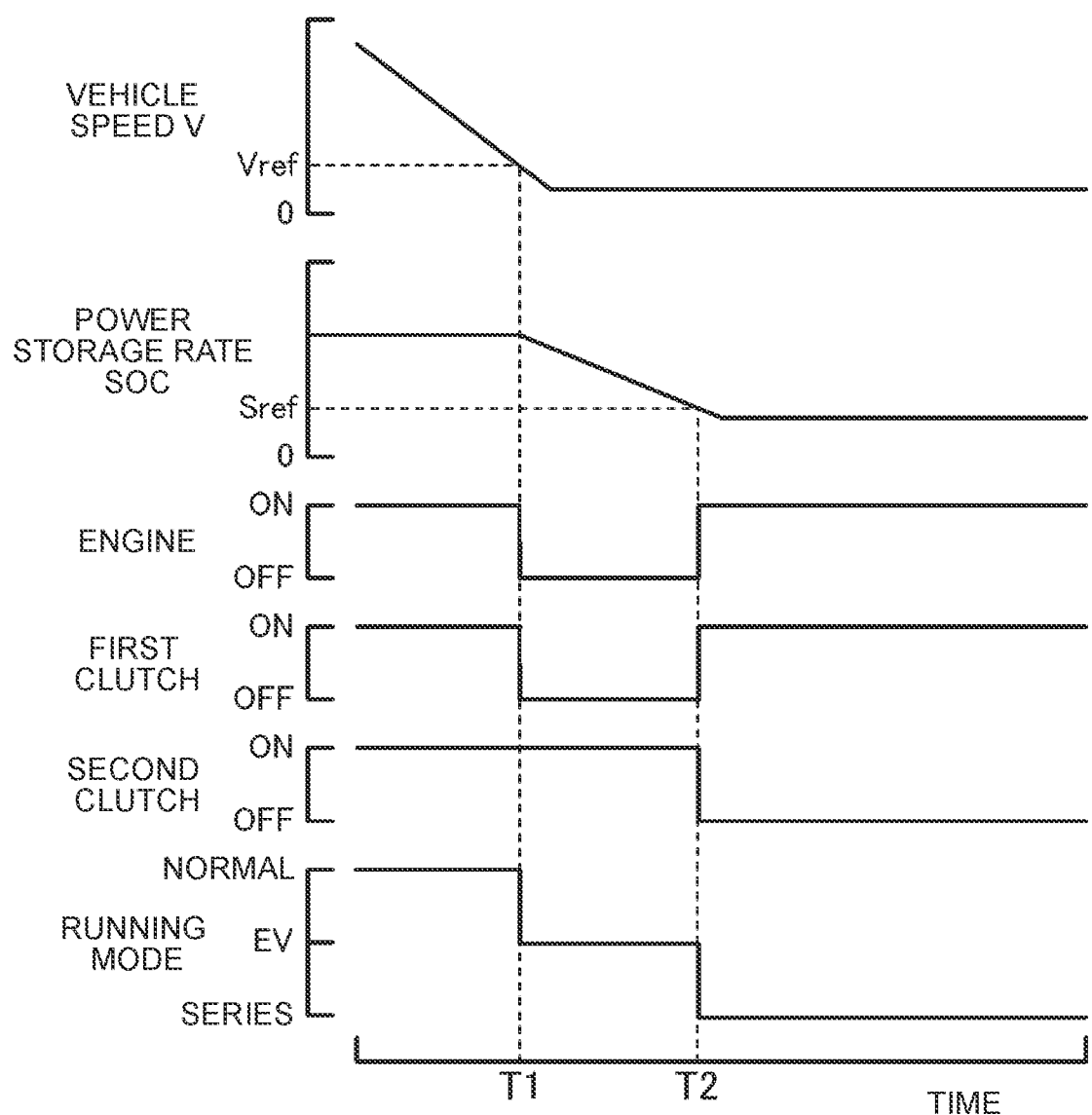
FIG. 3 is an explanatory time chart showing an example of changes over time in a vehicle speed V, a power storage rate SOC, an operation state of an engine 22, states of a first clutch 24 and a second clutch 32, and running modes since a vehicle speed V becomes equal to or lower than a threshold Vref.

FIG. 3 is an explanatory time chart showing an example of changes over time in the vehicle speed V, the power storage rate SOC, an operation state of the engine 22, states of the first clutch 24 and the second clutch 32, and the running modes since the vehicle speed V becomes equal to or lower than the threshold Vref. When the vehicle speed V becomes equal to or lower than the threshold Vref at time T1, the power storage rate SOC is equal to or higher than the threshold Sref. Therefore, the engine 22 is stopped, the first clutch 24 is disengaged, the second clutch 32 is engaged, and the running mode is switched from the normal running mode to the EV drive mode in which the hybrid vehicle 20 runs using the power from the first motor generator 26 and the power from the second motor generator 42. When the power storage rate SOC becomes lower than the threshold Sref at time T2, the engine 22 is started, the first clutch 24 is engaged, the second clutch 32 is disengaged, and the running mode is switched from the EV drive mode to the series mode in which the first motor generator 26 generates power using the power from the engine 22 and the hybrid vehicle 20 runs using the power from the second motor generator 42.

In the hybrid vehicle 20 according to the embodiment described above, when the vehicle speed V is equal to or lower than the threshold Vref, the first clutch 24 is engaged, the second clutch is disengaged, and the running mode is set to the series mode in which the first motor generator 26 generates power using the power from the engine 22 and the hybrid vehicle 20 runs using the power from the second motor generator 42. Accordingly, it is not necessary to slip the second clutch 32 when the vehicle speed V is equal to or lower than the threshold Vref. Thus, it is possible to suppress the second clutch 32 from overheating due to slipping of the second clutch 32. As a result, the durability of the friction engagement second clutch 32 can be improved. Furthermore, when the vehicle speed V is equal to or lower than the threshold Vref but the power storage rate SOC of the battery 30 is equal to or higher than the threshold Sref, the first clutch 24 is disengaged, the second clutch 32 is engaged, and the running mode is set to the EV drive mode in which the hybrid vehicle 20 runs using the power from the first motor generator 26 and the power from the second motor generator 42 with the engine 22 stopped. Thus, the hybrid vehicle 20 can run using the power from the first motor generator 26 in addition to the power from the second motor generator 42.

In the hybrid vehicle 20 according to the embodiment, when the vehicle speed V is equal to or lower than the threshold Vref and the power storage rate SOC of the battery 30 is equal to or higher than the threshold Sref, the EV drive mode is set, and when the vehicle speed V is equal to or lower than the threshold Vref and the power storage rate SOC of the battery 30 is lower than the threshold Sref, the series mode is set. However, the series mode may be set regardless of the power storage rate SOC of the battery 30.

In the hybrid vehicle 20 according to the embodiment, when the vehicle speed V is equal to or lower than the threshold Vref but the power storage rate SOC of the battery 30 is equal to or higher than the threshold Sref, the first clutch 24 is disengaged and the second clutch 32 is engaged. Alternatively, the first clutch 24 and the second clutch 32 may both be engaged in the situation described above. In this case, the crankshaft of the engine 22 is rotated accordingly.

In the hybrid vehicle 20 according to the embodiment, the engine 22 and the first motor generator 26 are connected, through the transmission 34, to the first drive shaft 36 coupled to the front wheels 39a, 39b through the differential gear 38, and the second motor generator 42 is connected to the second drive shaft 46 coupled to the rear wheels 49a, 49b through the differential gear 48. Alternatively, the second motor generator 42 may be connected to the first drive shaft 36 coupled to the front wheels 39a, 39b through the differential gear 38, and the engine 22 and the first motor generator 26 may be connected, through the transmission 34, to the second drive shaft 46 coupled to the rear wheels 49a, 49b through the differential gear 48.

In the hybrid vehicle 20 according to the embodiment, the battery 30 is used as a power storage device. Alternatively, a capacitor may be used as the power storage device.

In the embodiment, the engine 22 is an example of the "engine" according to the present disclosure, the first motor generator 26 is an example of the "first motor generator" according to the present disclosure, the first clutch 24 is an example of the "first clutch" according to the present disclosure, the second clutch 32 is an example of the "second clutch" according to the present disclosure, the second motor generator 42 is an example of the "second motor generator" according to the present disclosure, and the battery 30 is an example of the "power storage device" according to the present disclosure, and the electronic control unit 50 is an example of the "control device" according to the present disclosure.

The embodiment is an example for specifically describing the mode for carrying out the present disclosure.

Although the mode for carrying out the present disclosure has been described with reference to the embodiment, the present disclosure is not limited to any of the embodiment described above, and it goes without saying that the present disclosure may be carried out in various modes within the scope of the present disclosure.

The present disclosure can be applied to industries for manufacturing hybrid vehicles, etc.

What is claimed is:

1. A hybrid vehicle comprising:
   an engine;
   a first motor generator;
   a first clutch configured to allow and interrupt power transmission between an output shaft of the engine and a rotary shaft of the first motor generator;
   a second clutch that is a friction engagement clutch and that is configured to allow and interrupt power transmission between the rotary shaft of the first motor generator and a first drive shaft coupled to one of a front wheel and a rear wheel;
   a second motor generator configured to input power from and output power to a second drive shaft coupled to the other of the front wheel and the rear wheel, which differs from the one of the front wheel and the rear wheel;
   a power storage device connected to the first motor generator such that power transmission between the first motor generator and the power storage device is allowed, and the second motor generator such that power transmission between the second motor generator and the power storage device is allowed;
   a vehicle speed sensor configured to detect a vehicle speed; and
   an electronic control unit configured to control the engine, the first motor generator, the second motor generator, the first clutch, and the second clutch, the electronic control unit being configured to engage the first clutch and disengage the second clutch such that the first motor generator generates power using power from the engine and the hybrid vehicle runs using power from the second motor generator, when the vehicle speed transmitted from the vehicle speed sensor is equal to or lower than a predetermined vehicle speed,
   wherein the predetermined vehicle speed is a maximum vehicle speed within a vehicle speed region in which the second clutch needs to be slipped to transmit power from the engine to the first drive shaft.

2. The hybrid vehicle according to claim 1, wherein the electronic control unit is configured to stop the engine, disengage the first clutch, and engage the second clutch such that the hybrid vehicle runs using at least one of power from the first motor generator and the power from the second motor generator, when the vehicle speed is equal to or lower than the predetermined vehicle speed but a power storage rate of the power storage device is equal to or higher than a predetermined rate.

* * * * *